US009742171B2

(12) United States Patent
Nooner et al.

(10) Patent No.: US 9,742,171 B2
(45) Date of Patent: Aug. 22, 2017

(54) ELECTRICAL CORD CONNECTION COVERING TECHNIQUES

(71) Applicant: MIDWEST INNOVATIVE PRODUCTS, LLC, Orland Park, IL (US)

(72) Inventors: Bryan Nooner, Orland Park, IL (US); Robert B. Zajeski, Jr., Homer Glen, IL (US); Ben Lynch Zajeski, Homer Glen, IL (US)

(73) Assignee: MIDWEST INNOVATIVE PRODUCTS, LLC, Frankfort, IL (US)

( * ) Notice: Subject to any disclaimer, the term of this patent is extended or adjusted under 35 U.S.C. 154(b) by 0 days.

(21) Appl. No.: 14/703,274

(22) Filed: May 4, 2015

(65) Prior Publication Data

US 2016/0329132 A1 Nov. 10, 2016

(51) Int. Cl.
*H02G 3/08* (2006.01)
*H01R 13/52* (2006.01)
*H01R 4/70* (2006.01)
*H02G 15/10* (2006.01)
*H01R 13/639* (2006.01)

(52) U.S. Cl.
CPC ........... *H02G 3/088* (2013.01); *H01R 4/70* (2013.01); *H01R 13/5213* (2013.01); *H02G 15/10* (2013.01); *H01R 13/6392* (2013.01)

(58) Field of Classification Search
CPC ........ H01R 13/512; H01R 13/59; H01R 9/05; H01R 9/0506; H01R 4/021; H01R 11/11; H01R 4/023; H01R 4/22; H01R 13/5213; H01R 4/70; H01R 13/6392; H01R 9/0518; H01R 9/0521; H01R 9/0524; H01R 9/0527; H02G 15/115; H02G 15/043; H02G 3/04; H02G 3/06; H02G 3/088; H02G 15/10; B60R 16/0207; H01B 7/0045
USPC ...... 174/84, 88, 74 R, 91, 21 R, 77 R, 74 A, 174/72 C, 41
See application file for complete search history.

(56) References Cited

U.S. PATENT DOCUMENTS 3,441,659 A * 4/1969 Laudig ..................... H01R 4/20
174/88 C
5,217,387 A 6/1993 Hull
5,347,084 A * 9/1994 Roney .................. G02B 6/4447
174/92

(Continued)

OTHER PUBLICATIONS

PCT, Notification of Transmittal of the International Search Report and the Written Opinion of the International Searching Authority, or the Declaration, in International application No. PCT/US2016/026737, dated Jul. 1, 2016 (17 pages).

*Primary Examiner* — Pete Lee
(74) *Attorney, Agent, or Firm* — McAndrews, Held & Malloy, Ltd.

(57) ABSTRACT

An electrical connection covering apparatus is designed to protect from moisture a connection between a plug of one extension cord and a socket of another extension cord. A compressible and elastic diaphragm is used to form a seal around the cables of the extension cords where they enter the apparatus. The apparatus includes a housing that has at least one aperture. The diaphragm extends across the aperture. The diaphragm projects inwardly with respect to an interior surface of the housing. The compressibility and elasticity of the diaphragm material is greater than that of the housing material.

18 Claims, 9 Drawing Sheets

(56) References Cited

U.S. PATENT DOCUMENTS

| | | | |
|---|---|---|---|
| 5,886,300 A * | 3/1999 | Strickler | G02B 6/4444 |
| | | | 174/135 |
| 6,250,946 B1 | 6/2001 | Tardy | |
| 8,702,440 B2 * | 4/2014 | Nooner | H01R 13/5213 |
| | | | 439/279 |
| 2005/0085118 A1 | 4/2005 | Robbins | |
| 2013/0081849 A1 | 4/2013 | Simmons | |
| 2013/0165002 A1 * | 6/2013 | Nooner | H01R 13/516 |
| | | | 439/892 |

\* cited by examiner

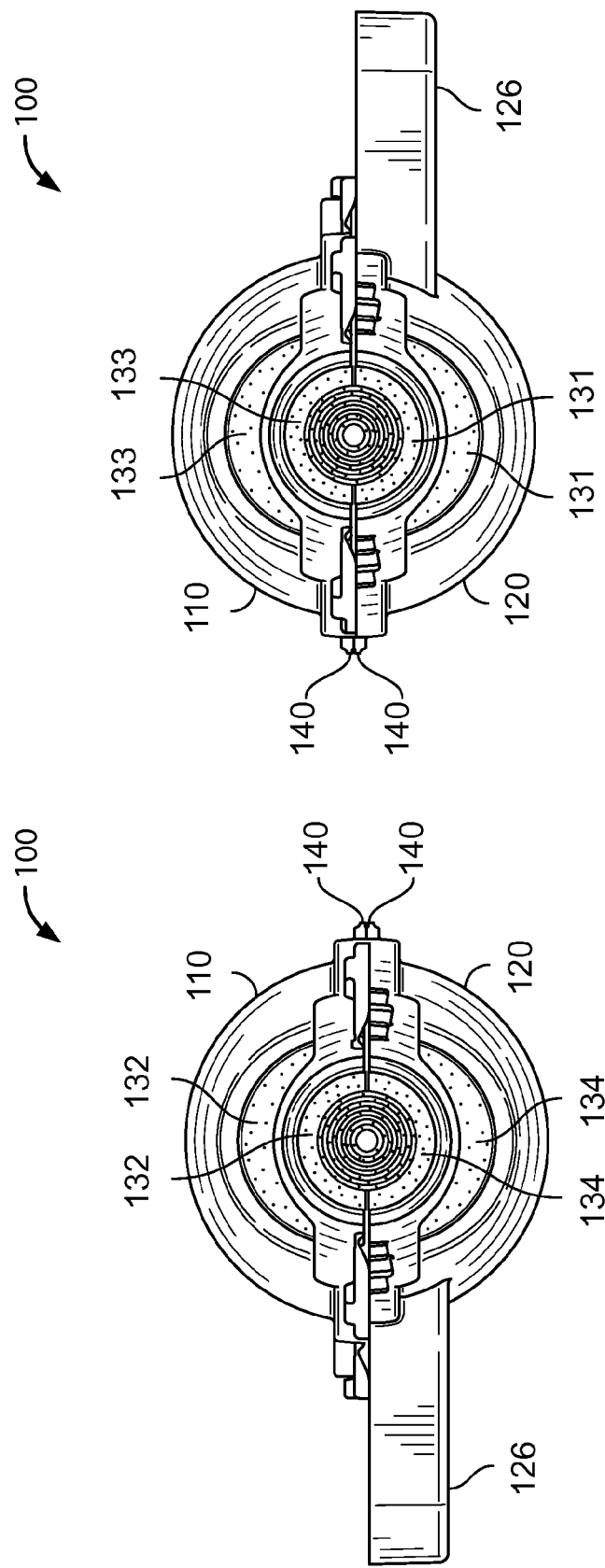

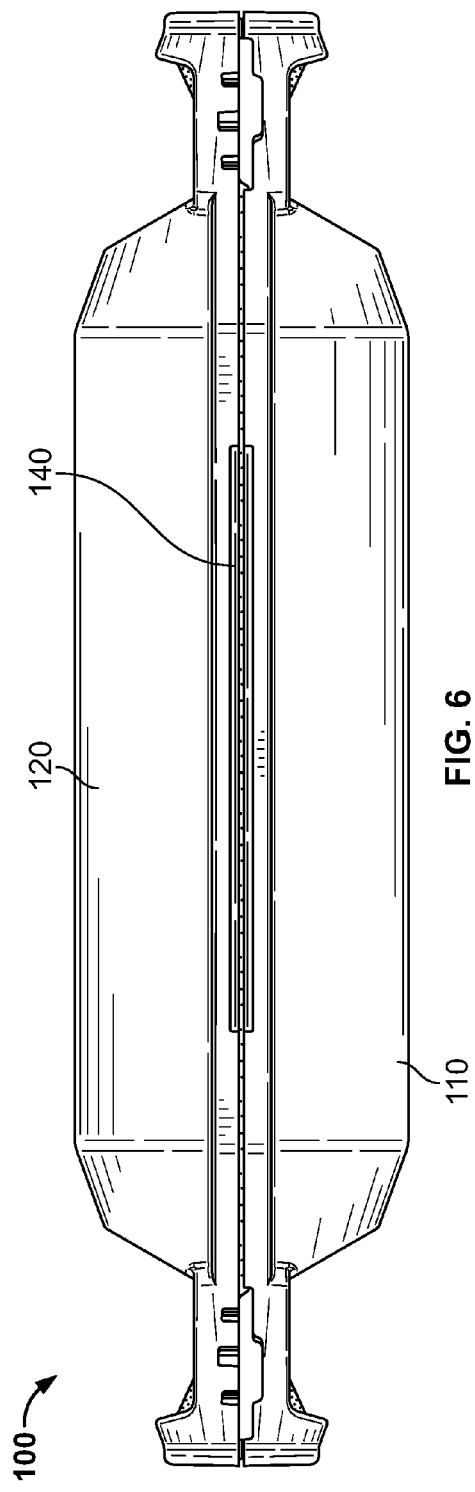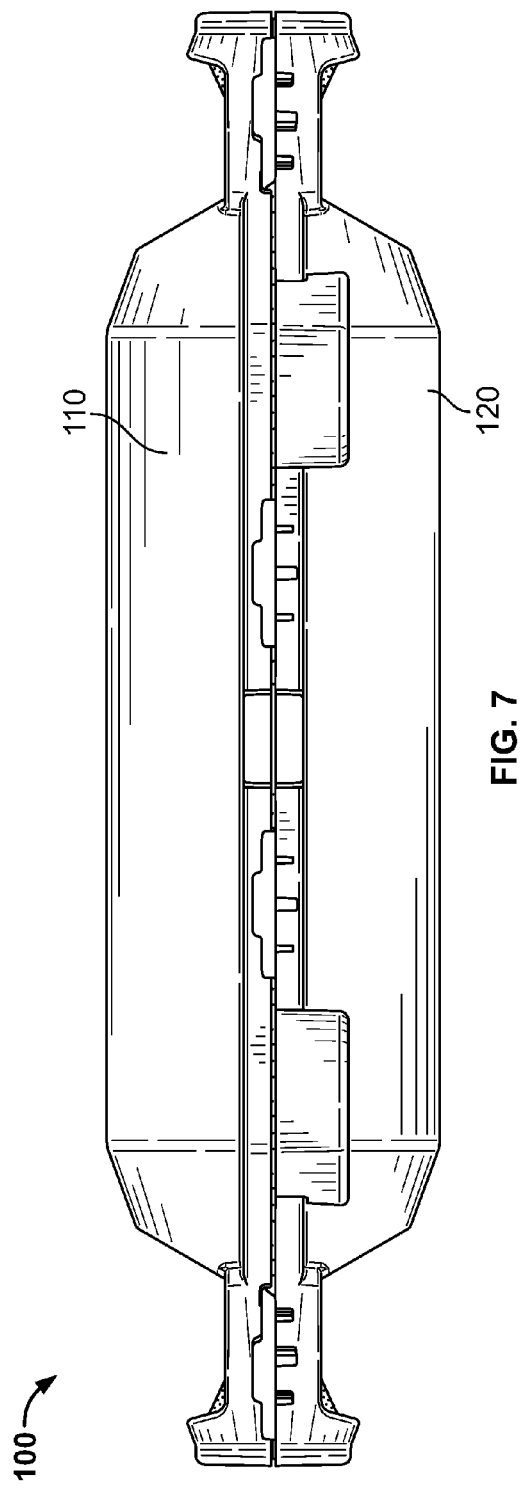

ELECTRICAL CORD CONNECTION COVERING TECHNIQUES

CROSS REFERENCE TO RELATED APPLICATIONS

[Not Applicable]

FEDERALLY SPONSORED RESEARCH OR DEVELOPMENT

[Not Applicable]

JOINT RESEARCH AGREEMENT

[Not Applicable]

SEQUENCE LISTING

[Not Applicable]

BACKGROUND

Generally speaking, this application discloses techniques relating to weatherproofing plug connections for electrical cords, such as extension cords or decorative lighting cords.

It may be desirable to keep moisture from interfering with electrical cord plug connections. If such a connection is corrupted by moisture, short circuits to ground may occur causing a potentially dangerous condition or causing circuit breakers, fuses, or ground-fault interrupt protection circuits to prevent the flow of current through the electrical cord. For example, outdoor holiday lighting often involves the use of multiple plug connections in an environment with unfavorable environmental conditions (for example, snow, melting snow, fog, sleet, freezing rain, rain, extreme temperatures, salt, etc.). Thus, it is desirable to have an apparatus that covers a plug connection that is substantially sealed to prevent corruption of the plug connection by moisture.

SUMMARY

According to certain inventive techniques, an electrical connection covering apparatus has a housing portion including a housing material, an exterior surface, an interior surface, and a first diaphragm aperture. The apparatus also has a first diaphragm including a diaphragm material that extends across the first diaphragm aperture and projects inwardly with respect to the interior surface of the housing portion. The compressibility and elasticity of the diaphragm material is greater than that of the housing material.

The first diaphragm includes an interior surface, an exterior surface, and may have a recess projecting outwardly with respect to the interior surface of the first diaphragm. The recess may be shaped like a half-funnel and may have one or more inwardly projecting ribs.

The housing portion may have a second diaphragm aperture and the apparatus may further include a second diaphragm extending across the second diaphragm aperture and projecting inwardly with respect to the interior surface of the housing portion. The second diaphragm may include the same material as the first diaphragm. The second diaphragm may also have an outwardly projecting recess. This recess may also be shaped like a half-funnel and may have one or more inwardly projecting ribs.

According to certain inventive techniques, an electrical connection covering apparatus covers a connection of a first electrical cord including a plug and a cable with a second electrical cord including a socket and a cable. The apparatus includes two housing portions and four diaphragms. The housing portions include a housing material and the diaphragms include a diaphragm material. Each housing portion includes an interior surface, an exterior surface, a first end having a recess projecting outwardly from the interior surface, a second end having a recess projecting outwardly from the interior surface, a first diaphragm aperture proximate the first end, and a second diaphragm aperture proximate the second end. The four diaphragms extend across the four diaphragm apertures, respectively. The diaphragms project inwardly from the corresponding interior surface of the housing portions. The first diaphragm and the third diaphragm may oppose, or preferably contact, each other when the first housing portion is mated with the second housing portion. The second diaphragm and the fourth diaphragm may oppose, or preferably contact, each other when the first housing portion is mated with the second housing portion. The recess of the first end of the first housing portion and the recess of the first end of the second housing portion form together a receiving area to accommodate the first cord when the first housing portion is mated with the second housing portion. The recess of the second end of the first housing portion and the recess of the second end of the second housing portion form together a receiving area to accommodate the second cord when the first housing portion is mated with the second housing portion. The compressibility and elasticity of the diaphragm material is greater than that of the housing material.

Each of the diaphragms may include an outwardly projecting recess. The recess may have a half-funnel shape. When the housing portions are mated, the recesses of the first diaphragm and the third diaphragm form together a funnel shape and the recesses of the second diaphragm and the fourth diaphragm form together a funnel shape. The apparatus may also include elongated sealing portions that are located alongside the rims of the two housing portions. The elongated sealing portions may contact each other when the housing portions are mated. The sealing portions may include the diaphragm material. One sealing portion may be integrated with the first diaphragm and the second diaphragm. The other sealing portion may be integrated with the third diaphragm and the fourth diaphragm. The two housing portions may be clamshell portions. The apparatus may also include two strain relief portions.

According to certain inventive techniques, a method of manufacturing electrical cord covering apparatus includes: injecting a first material into a mold; cooling the first material to a hardened state to form a housing including a plurality of diaphragm apertures; transferring the hardened first material to a second mold; injecting a second material into the second mold; cooling the second material to form a plurality of diaphragms attached to the housing and covering corresponding ones of the plurality of diaphragm apertures. The compressibility and elasticity of the second material is greater than that of the first material.

BRIEF DESCRIPTION OF SEVERAL VIEWS OF THE DRAWINGS

FIG. 4 illustrates a right-side view of the electrical connection covering apparatus in the closed position.

FIG. 5 illustrates a left-side view of the electrical connection covering apparatus in the closed position.

FIG. 6 illustrates a rear view of the electrical connection covering apparatus in the closed position.

FIG. 7 illustrates a front view of the electrical connection covering apparatus in the closed position.

Figure 1:
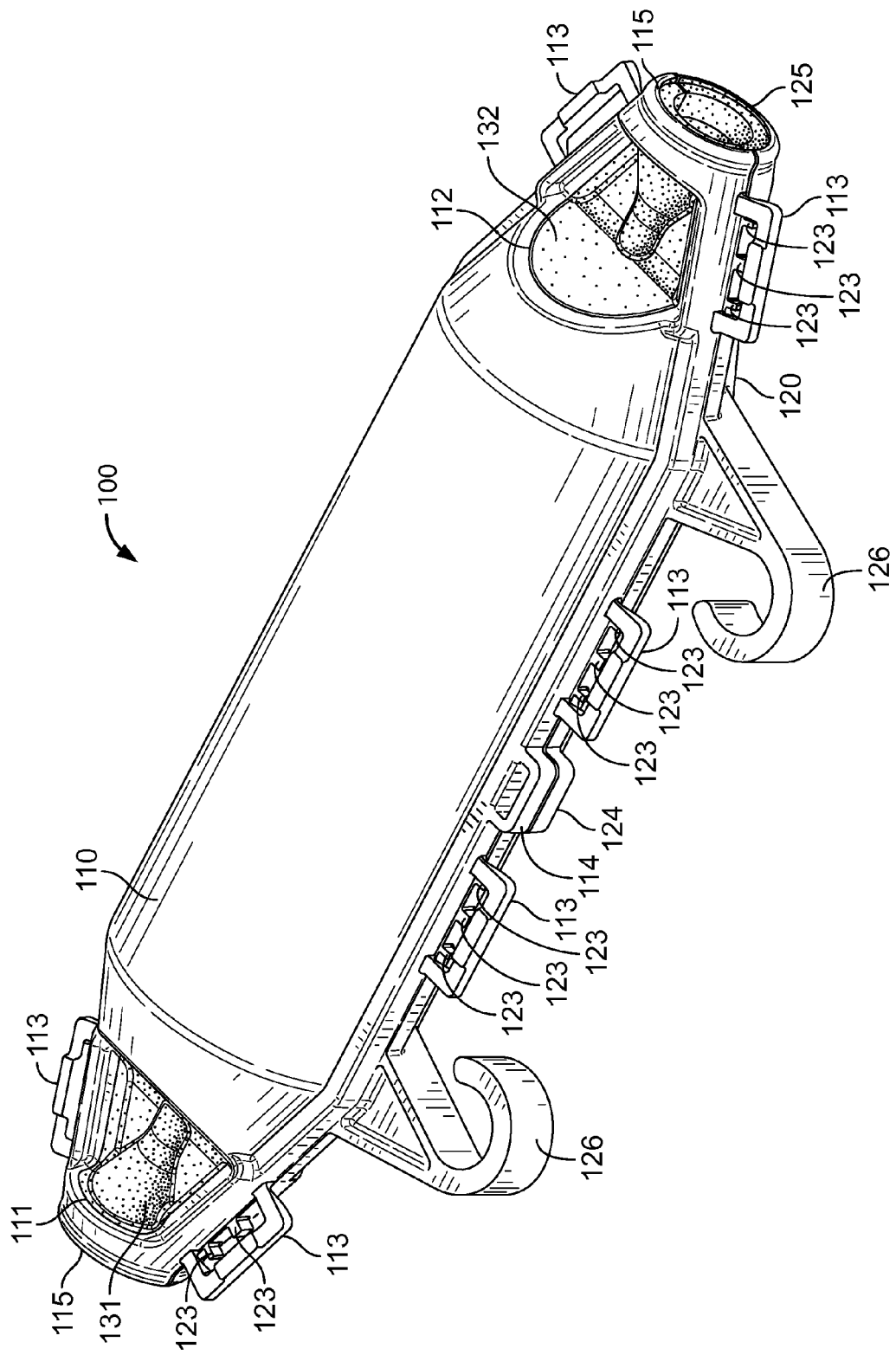
FIG. 1 illustrates a perspective view of an electrical connection covering apparatus in a closed position, according to certain inventive techniques.

The foregoing summary, as well as the following detailed description of certain techniques of the present invention, will be better understood when read in conjunction with the appended drawings. For the purposes of illustration, certain techniques are shown in the drawings. It should be understood, however, that the claims are not limited to the arrangements and instrumentality shown in the attached drawings. Furthermore, the appearance shown in the drawings is one of many ornamental appearances that can be employed to achieve the stated functions of the system.

DETAILED DESCRIPTION OF THE APPLICATION

Figure 8:
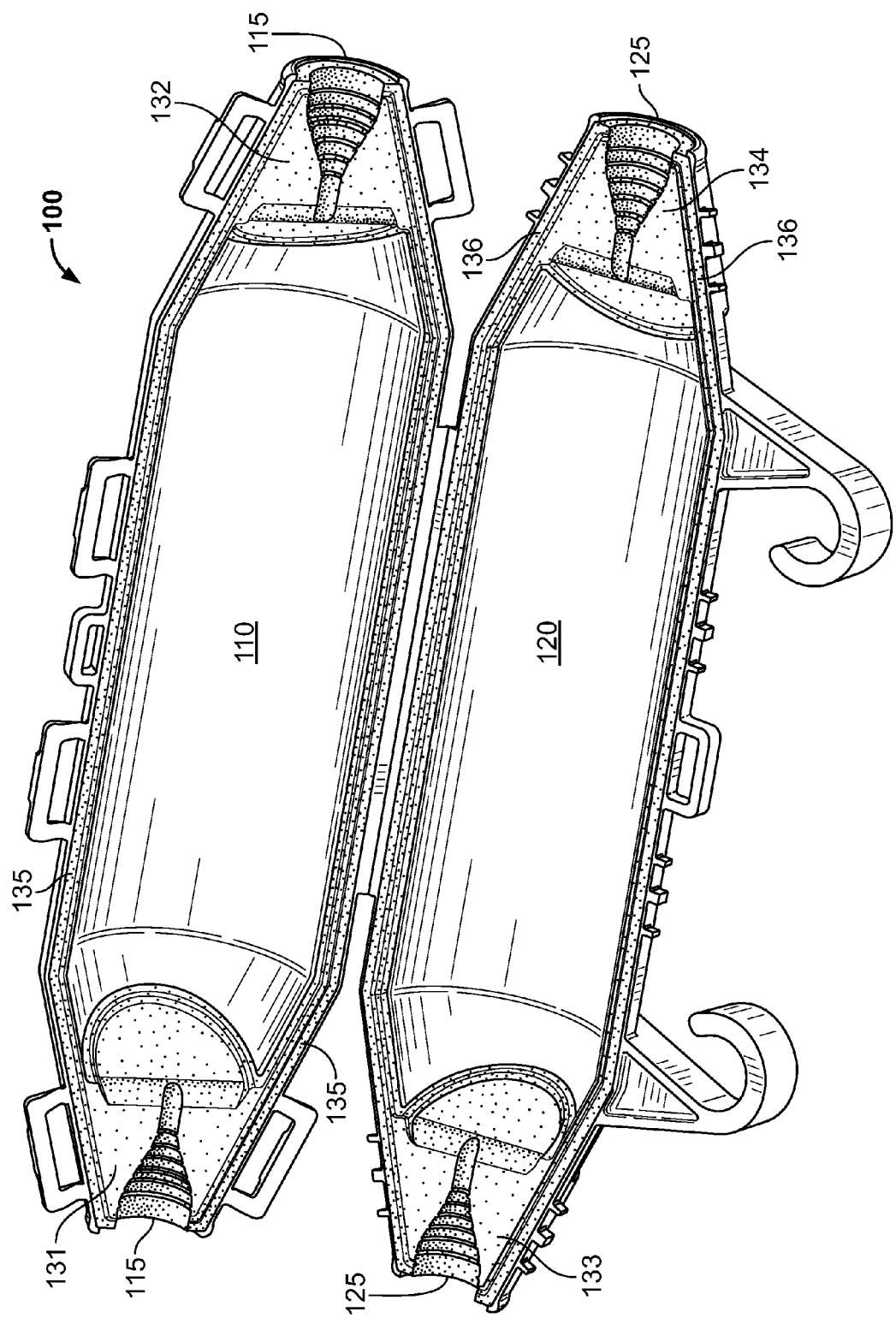
FIG. 8 illustrates a perspective view of the electrical connection covering apparatus in an open position.
Figure 9:
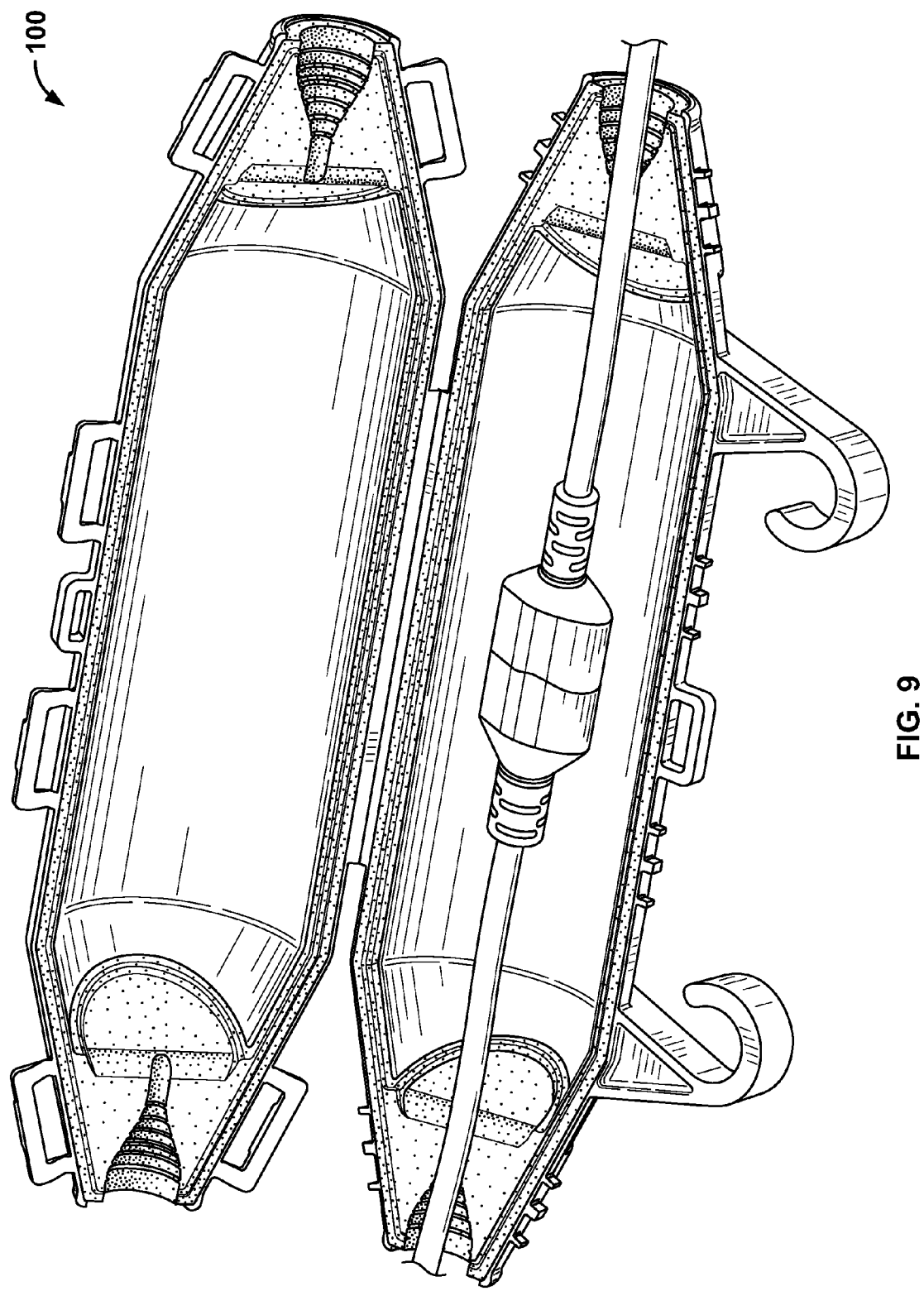
FIG. 9 illustrates a perspective view of the electrical connection covering apparatus in the open position with a portion of a first electrical cord and a portion of a second electrical cord.

FIGS. 1-8 show different views an apparatus 100 for covering an electrical connection between two cords, according to certain inventive techniques. FIGS. 1-7 show different views the apparatus 100 in a closed position and FIG. 8 shows the apparatus 100 in an open position. FIG. 9 also shows the apparatus 100 in an open position with connected electrical cords.

The apparatus 100 is intended to protect a plug/socket connection between electrical cords (e.g., extension cords). The apparatus 100 may include two housing portions 110, 120 that can be opened and closed. For example, the housing portions 110, 120 may be clamshell parts and they may be connected by a hinge 140 (such as a living hinge). When the apparatus 100 is in an open position (i.e., the housing portions 110, 120 are not fully engaged or mated), a plug/socket connection between electrical cords may be positioned as shown in FIG. 9. The housing portions 110, 120 may then be closed to form an enclosure that protects the connection from undesirable substances (e.g., water or salt).

There are two types of seals that are sealed by the enclosure. The first type of seal is around the edges of each housing portion 110, 120. The second type of seal is at the apertures in the ends of the apparatus 100, where the cables of the cords enter and exit the enclosure. The inventive techniques disclosed herein create effective seals to protect the plug connection.

The housing portions 110, 120 may be made of, or include a material such as plastic (e.g., polyethylene, polypropylene, ABS, polycarbonate, nylon, or the like) or metal. The material may be substantially rigid, and may have a relatively low compressibility and elasticity, such as those defined by the material data sheets available for the above-referenced plastic materials.

The material that forms the seals or is included in the seals (and diaphragms as discussed below) may be a thermoplastic elastomer. Other options could include silicone, rubber, ballistic gel, or the like. This material may be more compressible and more elastic than the aforementioned housing material.

The housing portions 110, 120, when mated or engaged, may form an inner hollow region that may be generally tube-shaped and may have a maximum radius. On each side of the tube, lateral regions may taper down to a radius that is smaller than the maximum radius of the inner hollow region. These lateral regions may be frustoconical. At the ends of these lateral regions, there are apertures where cables of the cords enter/exit the central region formed by the housing portions 110, 120 in the closed position. As will be discussed, diaphragms are employed to make seals around the cords at these apertures, thereby inhibiting the penetration of contaminants (e.g., water or moisture) into the inner hollow region of the enclosure.

For reference, each housing portion 110, 120 may have an interior surface that faces the interior hollow region of the enclosure and an exterior surface that faces outwardly from the enclosure. At each end of the housing portion 110 (e.g., right-side end and left-side end), there may be a recess 115. Each recess 115 may project outwardly from the interior surface of the housing portion 110. Each recess 115 may be arcuate. Similarly, at each end of the housing portion 120 (e.g., right-side end and left-side end), there may be a recess 125. Each recess 125 may project outwardly from the interior surface of the housing portion 120. Each recess 125 may be arcuate. When the housing portions 110, 120 are mated or engaged, the recesses 115, 125 together may form apertures in the ends of the apparatus 100. These apertures may be the ones through which the cables enter/exit the interior hollow region of the apparatus 100.

Figure 2:
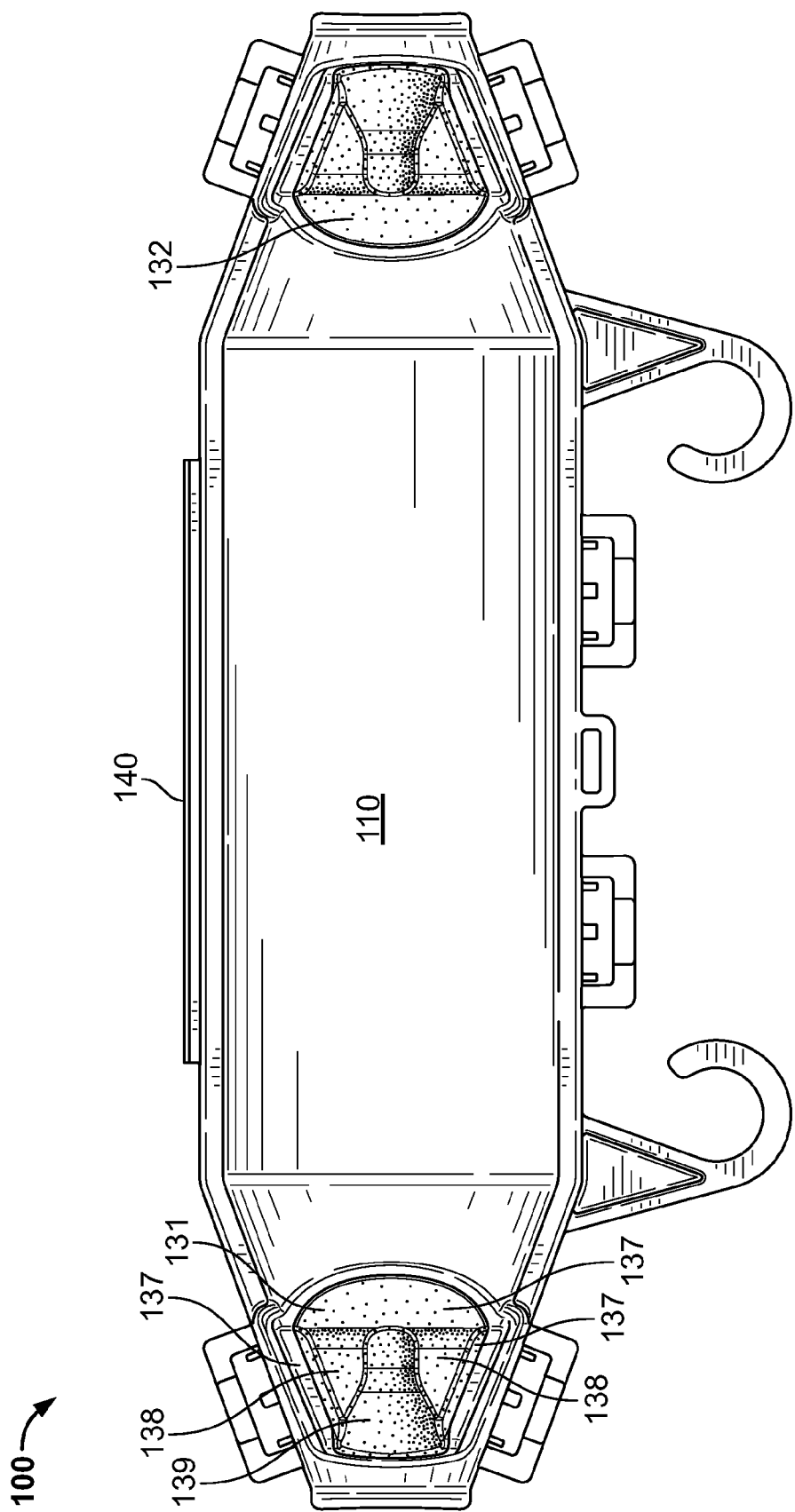
FIG. 2 illustrates a top view of the electrical connection covering apparatus in the closed position.
Figure 3:
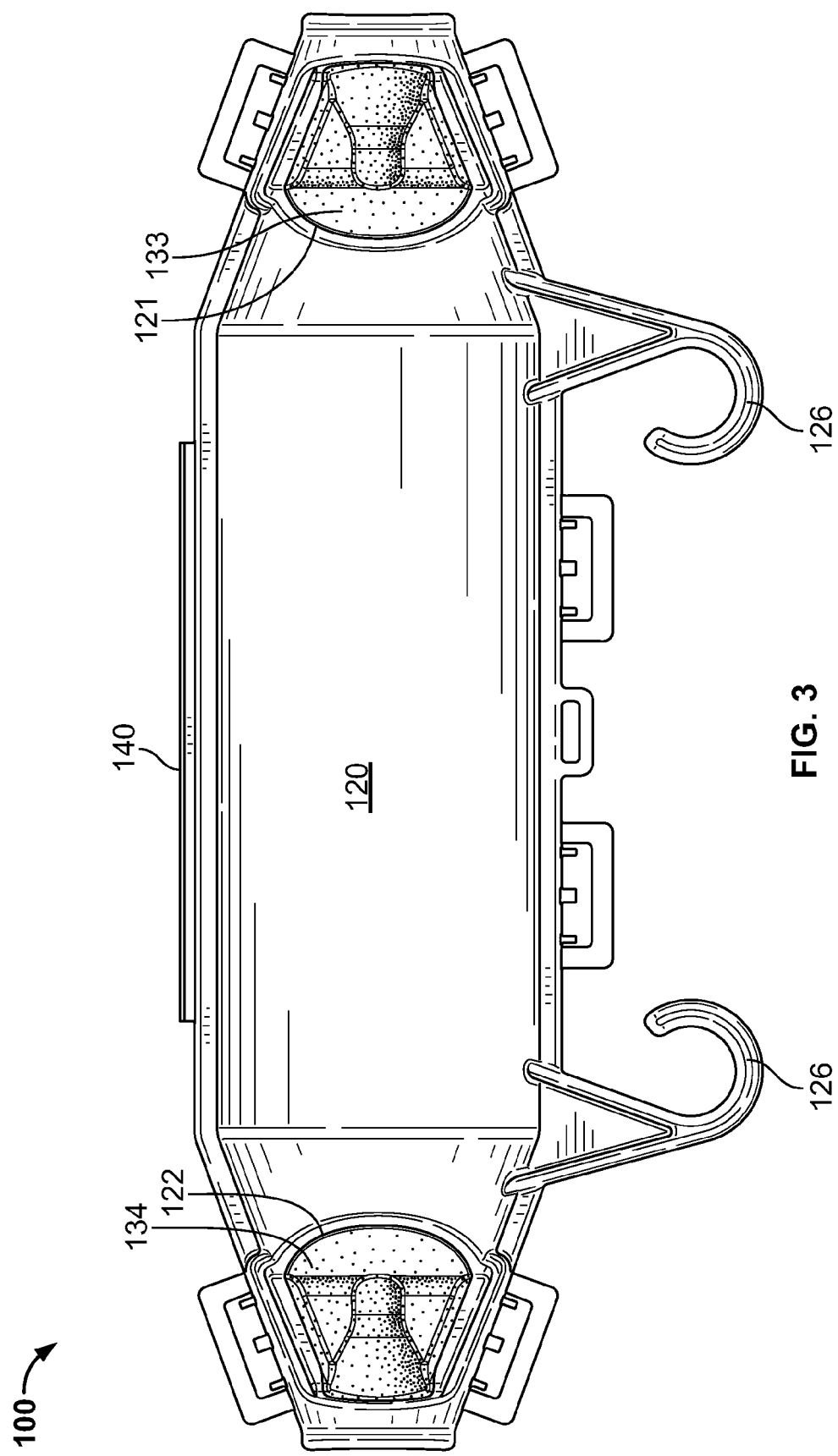
FIG. 3 illustrates a bottom view of the electrical connection covering apparatus in the closed position.

The housing portion 110 may include an aperture 111 proximate to one end of the housing portion 110 (e.g., the left-side end as depicted in FIGS. 1 and 2). The housing portion 110 may further include an aperture 112 proximate to the opposite end of the housing portion 110 (e.g., the right-side end as depicted in FIGS. 1 and 2). Similarly, the housing portion 120 may include an aperture 121 proximate to one end of the housing portion 120 (e.g., the left-side end as depicted in FIGS. 1 and 2). The housing portion 120 may further include an aperture 122 proximate to the opposite end of the housing portion 120 (e.g., the right-side end as depicted in FIGS. 1 and 2). The apertures 111, 112, 121, 122 may be referred to as diaphragm apertures for reasons that will become apparent from the discussion below.

A plurality of diaphragms 131, 132, 133, 134 extend across respective apertures 111, 112, 121, 122. The diaphragms 131, 132, 133, 134 may each include a material that is more elastic and compressible than a material used for the housing. The properties of elasticity and compressibility of the diaphragms 131, 132, 133, 134 assist to form a seal around the electrical cables that enter and exit the internal hollow region of the apparatus 100.

Edges of the diaphragms 131, 132 may optionally be connected or adhered to the housing portion 110 (e.g., the interior surface of the housing portion 110). Similarly, edges of the diaphragms 133, 134 may be connected to the housing portion 120 (e.g., the interior surface of the housing portion 120). For example, the edges of the diaphragms 131, 132, 133, 134 may be adhered to the housing portions 110, 120 through an over-molding process. A thermal bond may be used (e.g., ultrasonic bonding or friction welding). Channels, grooves, or other irregularities in the housing portions 110, 120 may be used to improve adherence of the diaphragms 131, 132, 133, 134 to the housing portions 110, 120 during the over-molding process. Instead of thermal bonding, glues or epoxies may be used.

The diaphragms 131, 132, 133, 134 may each project inwardly from the interior surface of the respective housing portions 110, 120 towards or into the interior hollow region. For example, as depicted in FIGS. 1-9, the diaphragms 131, 132, 133, 134 each include a sloped area 137 that extends inwardly and a horizontal area 138 that extends along a horizontal plane of the apparatus 100. The horizontal area 138 may be positioned at the bottom of the sloped area 137. The sloped area 137 permits the diaphragms to project inwardly towards or into the interior hollow region from the interior surface of the respective housing portions 110, 120. The inward projection of the sloped area 137 provides inward pressure on a cable when the apparatus 100 is in a closed position. The inward pressure of the diaphragms assists in forming a seal around the electrical cables that enter and exit the interior of apparatus 100.

Abutting the horizontal area 138, the diaphragm includes a recess 139 projecting outwardly away from the interior of the apparatus 100 (i.e., projecting outwardly with respect to the interior surface of the diaphragm).

Figure 11A:
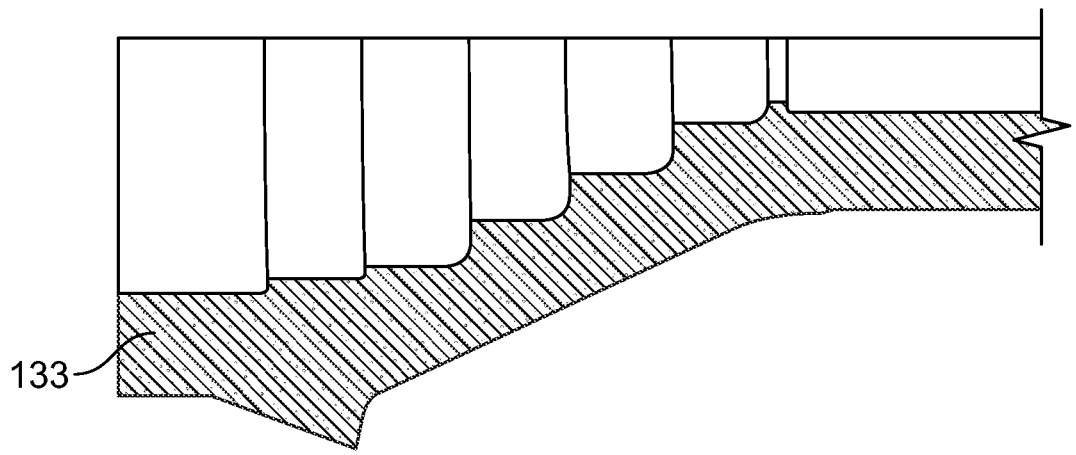
FIGS. 11A and 11B show a cross-sectional view of a diaphragm illustrating its staircase profile, according to certain inventive techniques.
Figure 11B:
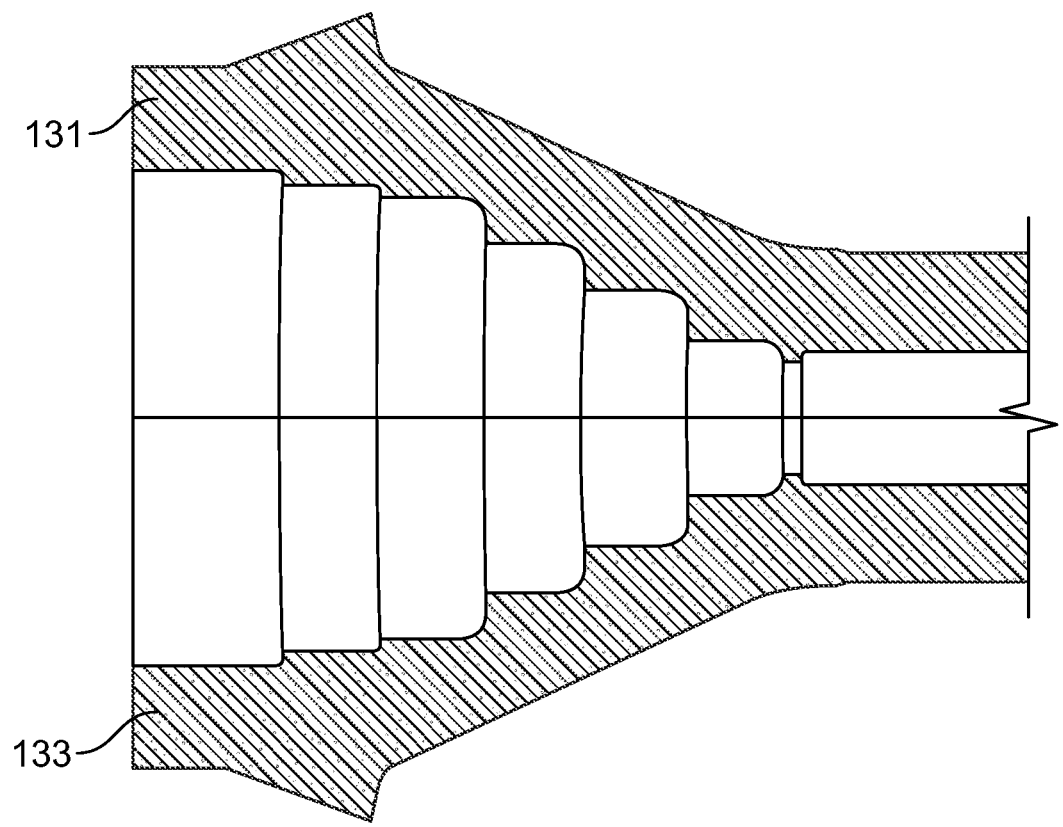

As depicted, the recess 139 may be shaped like half of a funnel. The recess 139 may have a staircase profile, as illustrated in FIGS. 11A and 11B. By "funnel" or "half-funnel" it should be understood that the recess 139 may have a staircase profile and still form a half-funnel shape. Different levels on the staircase profile may have radiuses to accommodate different cable sizes, respectively. Alternatively, the recess 139 may have a profile with continuously varying radiuses (i.e., smoothly varying and not a staircase profile). The recess 139 may have any suitable profile—e.g., rectangular, triangular, ovate, etc. According to one technique, the horizontal area 138 does not have a recess 139.

When the housing portions 110, 120 are mated or fully engaged with each other, the diaphragms 131, 133 may oppose each other, or contact each other. Similarly, the diaphragms 132, 134 may also oppose each other, or contact each other. In the example illustrated in FIGS. 1-9, the horizontal areas 138 of the respective diaphragms contact each other. The contact between the diaphragms 131, 133 and 132, 134 may assist in forming a seal around the electrical cables that enter and exit the hollow interior region of the apparatus 100. It should be understood, however, that the diaphragms 131, 133 and 132, 134 may still assist to form seals even if they do not necessarily form a contact between each other when the apparatus 100 is in a closed position.

The recesses 139 of the diaphragms 131, 133 may together form a receiving area to accommodate a cable of an electrical cord. The two half-funnel recesses 139 of diaphragms 131, 133 may form together a funnel-shaped receiving area. The recesses 139 of the diaphragms 132, 134 may also form together a receiving area to accommodate a cable of another electrical cord. Again, the two half-funnel recesses 139 of diaphragms 132, 134 may form together a funnel-shaped receiving area. The receiving areas may have other shapes, such as a tube-like shape. In the case when the recesses 139 have a staircase profile, as illustrated in FIG. 11, the receiving area may resemble a terraced wedding cake with the terraces or levels having diminishing radiuses. When the recesses 139 of the diaphragms form a staircase profile, the receiving area may have different levels, each sized to receive a different sized cable.

When the receiving area formed by the recesses 139 of the diaphragms 131, 133 accommodates a cable of an electrical cord, the diaphragms 131, 133 may stretch around the cable and compress against the cable. When the receiving area formed by the recesses 139 of the diaphragms 132, 134 accommodates a cable of an electrical cord, the diaphragms 132, 134 may stretch around the cable and compress against the cable. The elasticity and compression properties of the diaphragms 131, 133 assist in forming a seal around each cable.

According to the technique by which the horizontal area 138 does not have a recess, the diaphragms 131, 133 may still stretch around the cable and compress against the cable. It may be possible to have one diaphragm with a recess and one without (i.e., flat). It may also be possible to have a diaphragm with an outwardly projecting region (i.e., projecting outwardly rather than recessing inwardly). The principle of operation remains the same.

As illustrated in FIGS. 1-9, the apparatus 100 is also configured to form seals in an area around the edges of the housing portions 110, 120 when the housing portions 110, 120 are mated or engaged.

The housing portion 110 may have a rim around its edges. A first sealing portion 135 may be arranged around the rim of housing portion 110. The housing portion 120 may have a rim around its edges. A second sealing portion 136 may be arranged around the rim of housing portion 120. The sealing portions 135 and 136 may be elongate and extend along the rims of the housing portions 110, 120. The sealing portions 135 and 136 may not cover the outermost edges of the rims of the housing portions 110, 120. The sealing portions 135 and 136 may include the diaphragm material. The first sealing portion 135 may be integrated with the diaphragms 131 and 132 and the second sealing portion 136 may be integrated with the diaphragms 133 and 134.

When the housing portions 110, 120 are closed or mated to form an enclosure, the sealing portions 135 and 136 may contact each other. Contact between the sealing portions 135 and 136 assists in providing an effective seal around the rims of the housing portions 110, 120.

The apparatus 110 may be removably securable (e.g., capable of being engaged or mated) when in the closed position. For example, the apparatus 100 may include locking features 113, 123 and 114, 124. The locking features 113 and 114 may be part of the first housing portion 110, and the locking features 123 and 124 may be part of the second housing portion 120, or vice versa. The locking features 113, 123 may lockably mate with each other. The locking features 113, 123 may be snap locking features. The locking features 114, 124 may be configured to accommodate a lock, tie, or some other locking mechanism to secure the apparatus 100 in a closed position. The locking mechanisms 113, 123, 114, and 124 may be centrally located (as depicted in FIGS. 1-9) or may be located towards the ends of the housing portions 110, 120. There may be two, three, or more sets of the locking features 113, 123 and 114, 124. For example, there may be one set in the middle and one set on each of the ends of the housing portions 110, 120.

The apparatus 100 may also include one or more strain relief portions 126. The strain relief portions 126 may be a part of or integrated with the first housing portion 110 and/or the second housing portion 120. The strain relief portions 126 may be hook shaped (as depicted in FIGS. 1-3 and 8-9), and may project from the front or rear ends of the housing portions 110, 120. Alternatively, the strain relief portions 126 may project from the primary axial ends of the first or second housing portions 110, 120. Other arrangements of the strain relief portion(s) 126 may be possible. When the electrical cords forming a plug/socket connection are placed in the interior hollow region of the apparatus 100 formed by the housing portions 110, 120, the cables of the cords may be fed underneath, through, and/or around the strain relief portions 126. The strain relief portions 126 may relieve tension at the plug/socket connection, thereby preventing the connection from being inadvertently or improperly pulled apart.

Figure 10:
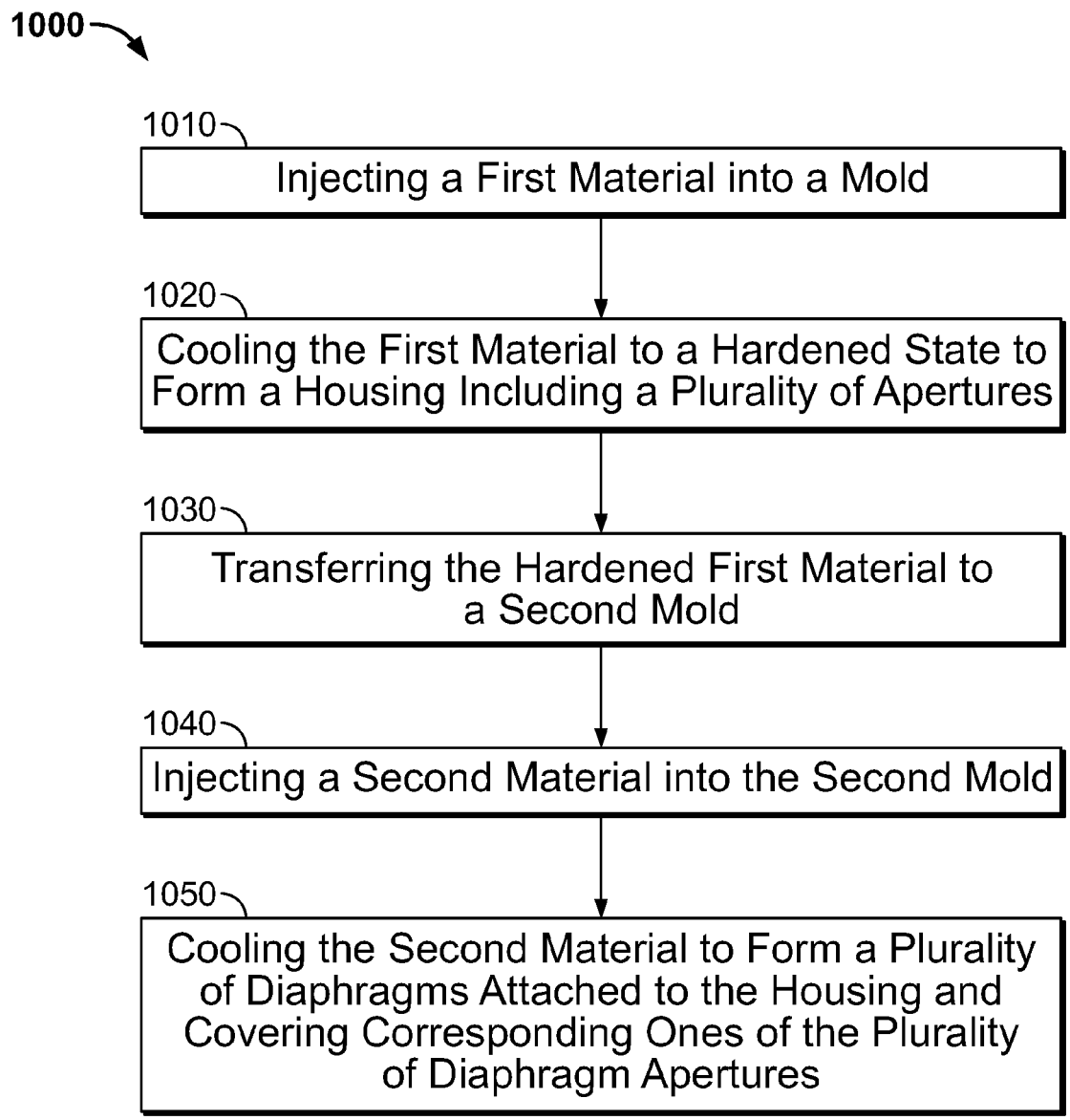
FIG. 10 shows a flowchart for a method of manufacturing an electrical connection covering apparatus, such as the one illustrated in FIGS. 1-9, according to certain inventive techniques.

FIG. 10 shows a flowchart 1000 for a method of manufacturing an electrical connection covering apparatus, such as the apparatus 100 illustrated in FIGS. 1-9, according to certain inventive techniques. According to the flowchart 1000, a housing material is injected into a first mold at step 1010. The first mold is configured to allow the housing material to form a housing including a plurality of diaphragm apertures. At step 1020, the housing material in the first mold is allowed to cool to a hardened state to form the housing including a plurality of diaphragm apertures. The hardened housing is then transferred to a second mold at step 1030. The second mold is configured to allow a diaphragm material to attach to the housing and cover the plurality of diaphragm apertures. A diaphragm material with a compressibility and elasticity that is greater than the housing material is selected, and, at step 1040, is injected into the second mold. At step 1050, the diaphragm material is then cooled to form a plurality of diaphragms attached to the housing material and covering the plurality of diaphragm apertures.

While the invention has been described with reference to certain techniques, it will be understood by those skilled in the art that various changes may be made and equivalents may be substituted without departing from the scope of the invention. In addition, many modifications may be made to adapt a particular situation or material to the teachings of the invention without departing from its scope. For example, the techniques described in the present application may be applicable not only to protecting electrical connections, but may also be useful for plumbing or other applications (e.g., medical applications). For example, the diaphragms may be used to create seals that inhibit the flow of fluids in any application. The seals may be useful for keeping fluids from flowing out of the housing as well as into the housing. Such an arrangement may be used to remedy, for example, a hole in a pipe or other plumbing whereby the seals formed according to the inventive techniques prevent the unrestrained flow of fluids. Therefore, it is intended that the invention not be limited to the particular technique disclosed, but that the invention will include all techniques falling within the scope of the appended claims.

The invention claimed is:

1. An apparatus comprising:
   a first housing portion including a housing material, an exterior surface, an interior surface, and a first diaphragm aperture;
   a second housing portion configured to mate with the first housing portion;
   a first diaphragm including a diaphragm material that extends across the first diaphragm aperture and projects inwardly with respect to the interior surface of the housing portion; and
   wherein:
      the apparatus includes a receiving aperture only when the first housing portion is mated with the second housing portion;
      the first diaphragm aperture exists when the first housing portion is not mated with the second housing portion and when the first housing portion is mated with the second housing portion;
      the first diaphragm aperture is separate from the receiving aperture;
      a compressibility of the diaphragm material is greater than a compressibility of the housing material; and
      an elasticity of the diaphragm material is greater than an elasticity of the housing material.

2. The apparatus of claim 1, wherein the first diaphragm includes an interior surface, an exterior surface, and a recess projecting outwardly with respect to the interior surface of the first diaphragm.

3. The apparatus of claim 2, wherein the recess of the first diaphragm comprises a half-funnel shape.

4. The apparatus of claim 2, wherein the recess comprises a staircase profile.

5. The apparatus of claim 1, wherein the housing portion further comprises a second diaphragm aperture, wherein the apparatus further includes:
   a second diaphragm including the diaphragm material, wherein the second diaphragm extends across the second diaphragm aperture and projects inwardly with respect to the interior surface of the housing portion.

6. The apparatus of claim 5, wherein:
   the first diaphragm includes an interior surface, an exterior surface, and a recess projecting outwardly with respect to the interior surface of the housing portion;
   the second diaphragm includes an interior surface, an exterior surface, and a recess projecting outwardly with respect to the interior surface of the housing portion; and
   the interior surface of the first diaphragm faces the interior surface of the second diaphragm.

7. The apparatus of claim 6, wherein:
   the recess of the first diaphragm comprises a half-funnel shape;
   the recess of the second diaphragm comprises a half-funnel shape; and
   when the interior surface of the first diaphragm faces the interior surface of the second diaphragm, a funnel shape is formed.

8. The apparatus of claim 6, wherein:
   the recess of the first diaphragm comprises a staircase profile; and
   the recess of the second diaphragm comprises a staircase profile.

9. An electrical connection covering apparatus for covering a connection of a first electrical cord including a plug and a cable with a second electrical cord including a socket and a cable, wherein the electrical connection covering apparatus comprises:
   a first housing portion including a housing material, an interior surface, an exterior surface, a first end having a recess projecting outwardly from the interior surface, a second end having a recess projecting outwardly from the interior surface, a first diaphragm aperture proximate the first end, and a second diaphragm aperture proximate the second end;
   a second housing portion that mates with the first housing portion and including the housing material, an interior surface, an exterior surface, a first end having a recess projecting outwardly from the interior surface, a second end having a recess projecting outwardly from the interior surface, a first diaphragm aperture proximate the first end, and a second diaphragm aperture proximate the second end;

a first diaphragm including a diaphragm material that extends across the first diaphragm aperture of the first housing portion and projects inwardly with respect to the interior surface of the first housing portion;

a second diaphragm including the diaphragm material that extends across the second diaphragm aperture of the first housing portion and projects inwardly with respect to the interior surface of the first housing portion;

a third diaphragm including a diaphragm material that extends across the first diaphragm aperture of the second housing portion and projects inwardly with respect to the interior surface of the second housing portion;

a fourth diaphragm including the diaphragm material that extends across the second diaphragm aperture of the second housing portion and projects inwardly with respect to the interior surface of the second housing portion; and wherein:

the electrical connection covering apparatus includes a receiving aperture only when the first housing portion is mated with the second housing portion;

the first diaphragm aperture exists when the first housing portion is not mated with the second housing portion and when the first housing portion is mated with the second housing portion;

the first diaphragm aperture is separate from the receiving aperture;

the first diaphragm and the third diaphragm oppose each other when the first housing portion is mated with the second housing portion;

the second diaphragm and the fourth diaphragm oppose each other when the first housing portion is mated with the second housing portion;

the recess of the first end of the first housing portion and the recess of the first end of the second housing portion form together a receiving area to accommodate the first cord when the first housing portion is mated with the second housing portion;

the recess of the second end of the first housing portion and the recess of the second end of the second housing portion form together a receiving area to accommodate the second cord when the first housing portion is mated with the second housing portion;

a compressibility of the diaphragm material is greater than a compressibility of the housing material; and an elasticity of the diaphragm material is greater than an elasticity of the housing material.

10. The electrical connection covering apparatus of claim 9, wherein:

the first diaphragm and the third diaphragm contact each other when the first housing portion is mated with the second housing portion; and the second diaphragm and the fourth diaphragm contact each other when the first housing portion is mated with the second housing portion.

11. The electrical connection covering apparatus of claim 9, wherein:

the first diaphragm includes an interior surface, an exterior surface, and a recess projecting outwardly with respect to the interior surface of the first diaphragm;

the second diaphragm includes an interior surface, an exterior surface, and a recess projecting outwardly with respect to the interior surface of the second diaphragm;

the third diaphragm includes an interior surface, an exterior surface, and a recess projecting outwardly with respect to the interior surface of the third diaphragm; and the fourth diaphragm includes an interior surface, an exterior surface, and a recess projecting outwardly with respect to the interior surface of the fourth diaphragm.

12. The electrical connection covering apparatus of claim 11, wherein the recesses of each of the first diaphragm, the second diaphragm, the third diaphragm, and the fourth diaphragm comprise a half-funnel shape.

13. The electrical connection covering apparatus of claim 12, wherein when the first housing portion is mated to the second housing portion:

the recesses of the first diaphragm and the third diaphragm form together a funnel shape; and the recesses of the second diaphragm and the fourth diaphragm form together a funnel shape.

14. The electrical connection covering apparatus of claim 9, further comprising:

a first elongated sealing portion located alongside a rim of the first housing portion;

a second elongated sealing portion located alongside a rim of the second housing portion; and wherein the first elongated sealing portion and the second elongated sealing portion contact each other when the first housing portion is mated to the second portion.

15. The electrical connection covering apparatus of claim 14, wherein the first elongated sealing portion and the second elongated sealing portion each comprise the diaphragm material.

16. The electrical connection covering apparatus of claim 15, wherein:

the first elongated sealing portion is integral with the first diaphragm and the second diaphragm; and the second elongated sealing portion is integral with the third diaphragm and the fourth diaphragm.

17. The electrical connection covering apparatus of claim 9, wherein:

the first housing portion comprises a clamshell portion; and the second housing portion comprises a clamshell portion.

18. The electrical cord covering apparatus of claim 9, further comprising:

a first strain relief portion extending away from and included as part of either of the first housing portion and the second housing portion; and a second strain relief portion extending away from and included as part of either of the first housing portion and the second housing portion.

* * * * *